Jan. 5, 1937.  J. E. MURPHY  2,066,537
TRACTOR SWEEP RAKE
Filed Nov. 16, 1934  3 Sheets-Sheet 2
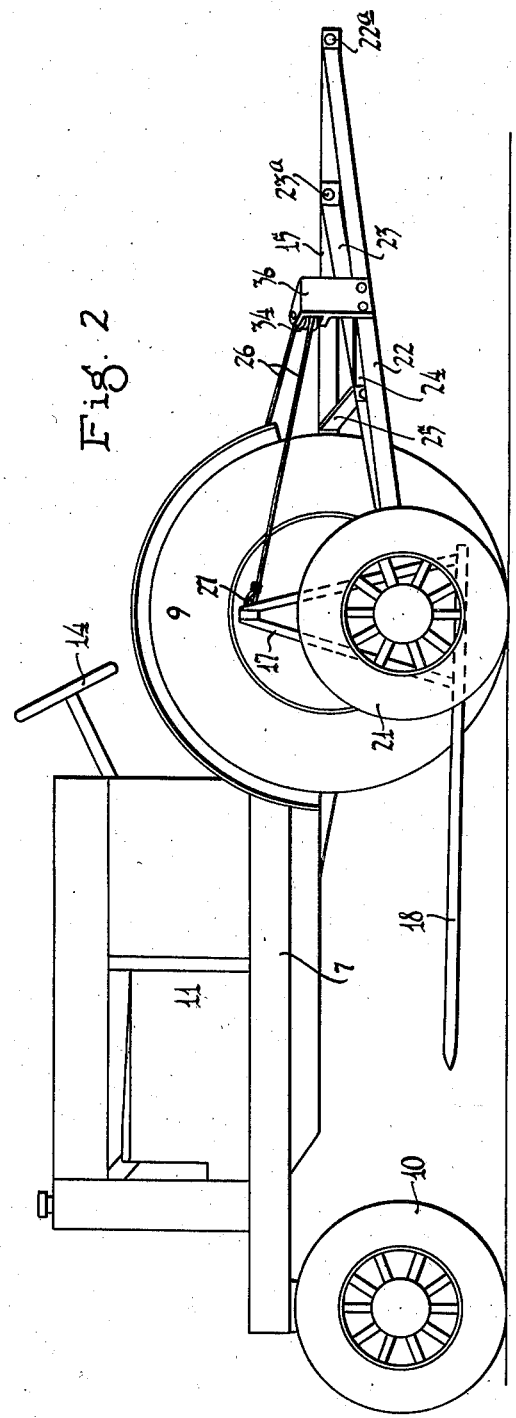
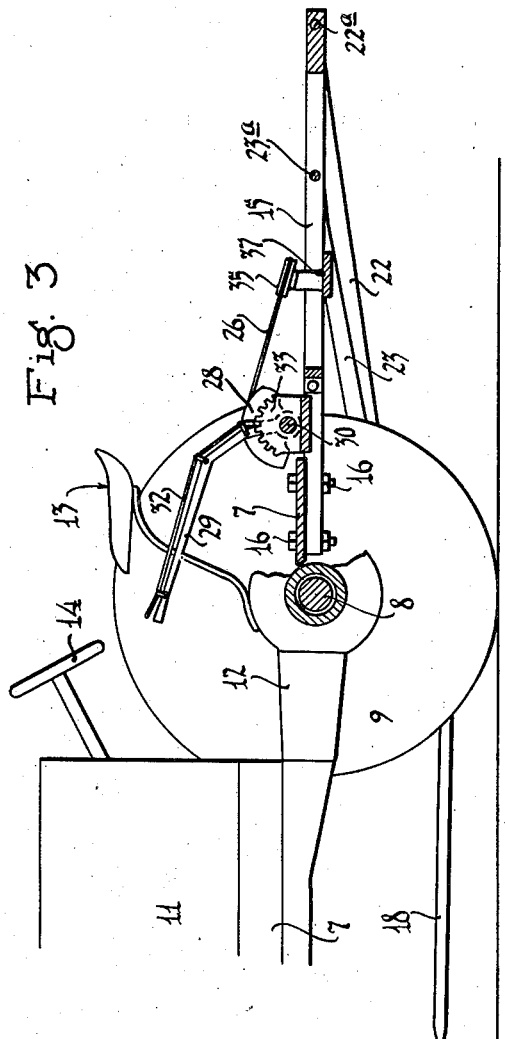
INVENTOR
Joseph E. Murphy
BY HIS ATTORNEYS
Michan & Kilgore Jan. 5, 1937. J. E. MURPHY 2,066,537
TRACTOR SWEEP RAKE
Filed Nov. 16, 1934 3 Sheets-Sheet 3
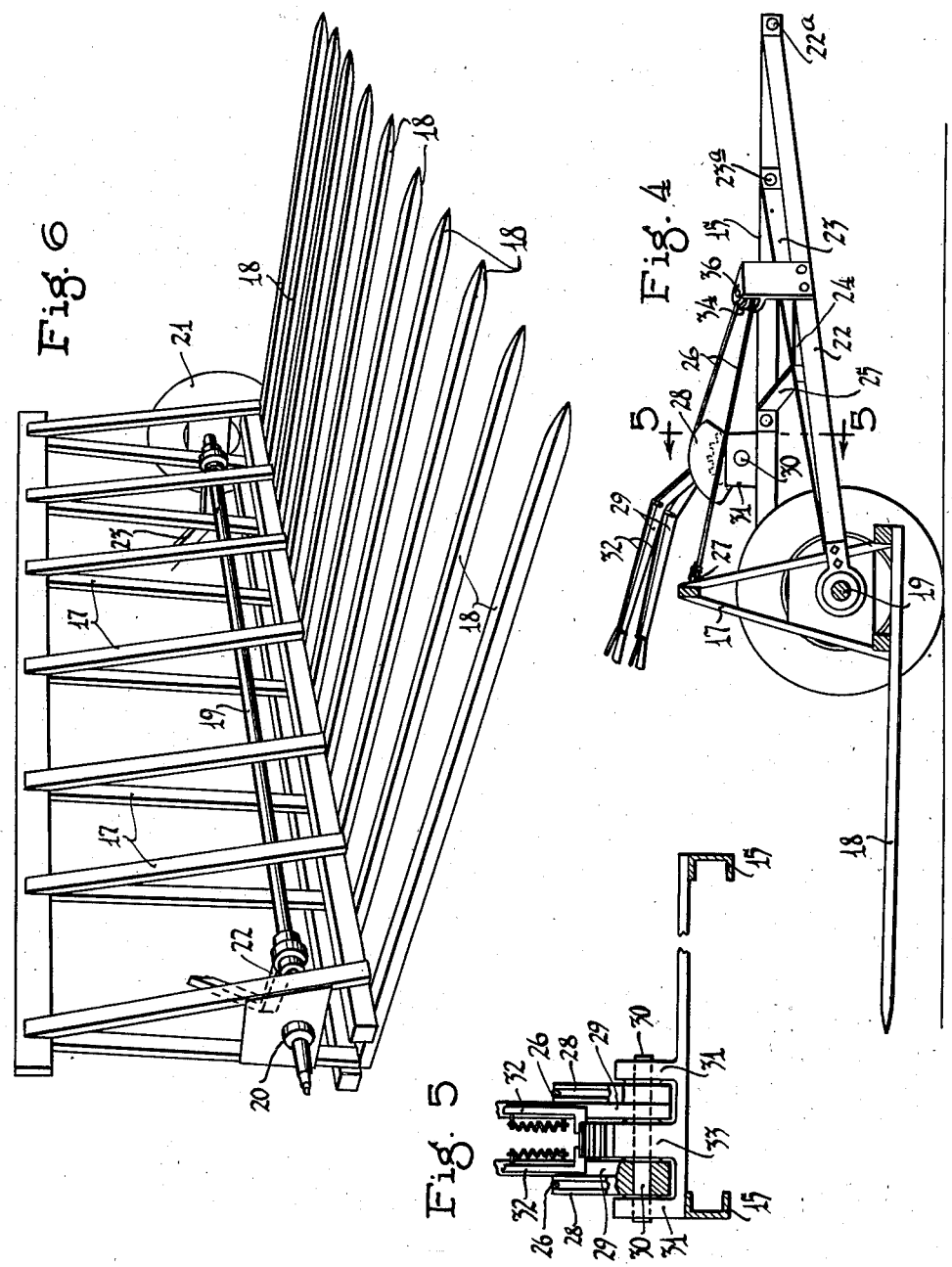
INVENTOR
Joseph E. Murphy
BY HIS ATTORNEYS Patented Jan. 5, 1937

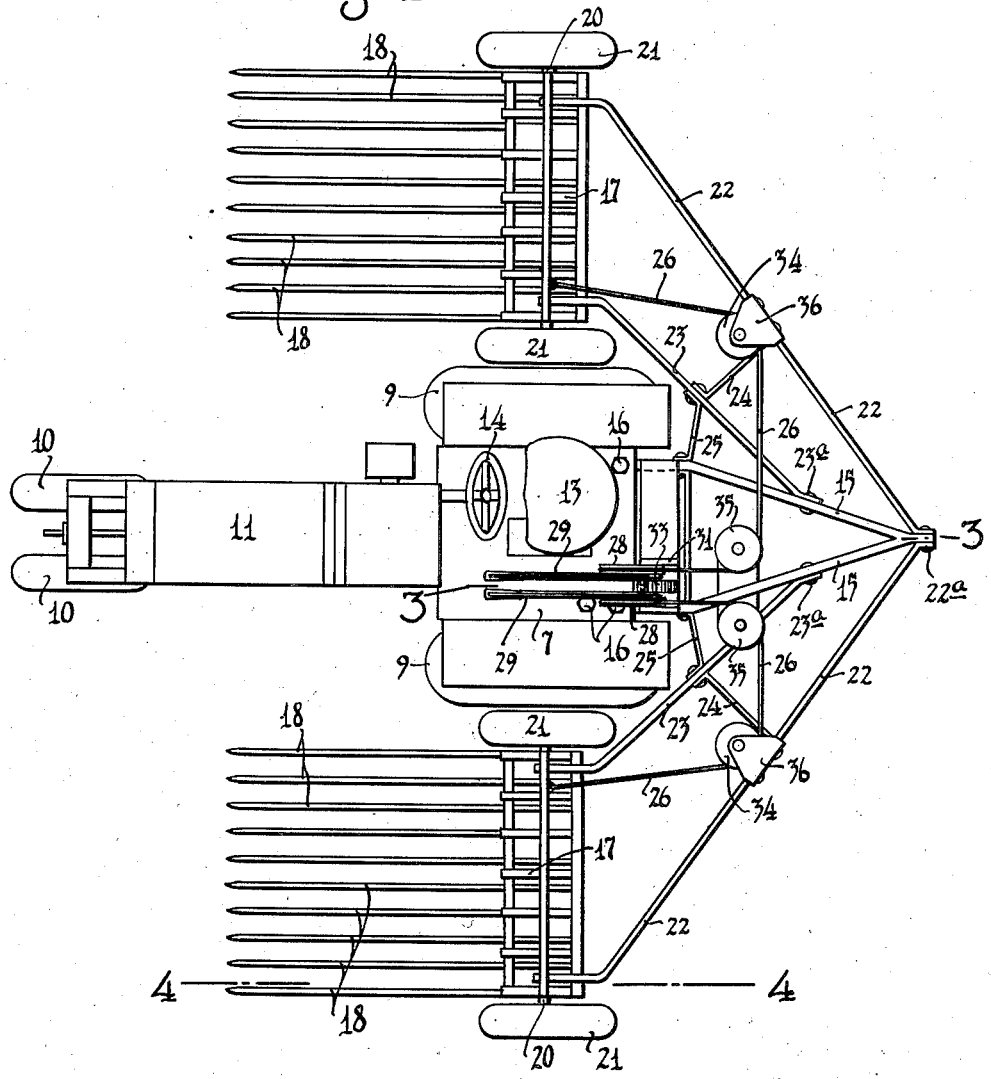

2,066,537

UNITED STATES PATENT OFFICE 2,066,537

TRACTOR SWEEP RAKE

Joseph E. Murphy, Minneapolis, Minn.

Application November 16, 1934, Serial No. 753,319

9 Claims. (Cl. 56—27)

My present invention provides an improved and highly efficient tractor sweep rake and, generally stated, consists of the novel devices, combinations of devices and arrangement of parts hereinafter described and defined in the claims. The present invention is directed particularly to an improved arrangement of the gathering rakes in respect to the tractor. In accordance with this new arrangement, the rakes are located one on each side of the tractor and are supported on truck wheels that are as nearly as practicable aligned with the axis of the rear wheels of the tractor, and these rakes and their trucks are connected to the rear portion of the tractor by push or thrust-acting connections attached to the rear of the tractor frame or an extension thereof, so that there are no rake-supporting connections to the tractor located forward of the rear tractor wheels. If the truck wheels of the rakes are made of the same diameter as the rear tractor wheels, then the axes of all of the wheels will be aligned, but when the wheels of the rake trucks are smaller or of less diameter than the rear tractor wheels, then their axes will be brought somewhat below the axis of the rear wheels but in or substantially in a vertical plane that includes the axis of the rear wheels. This arrangement is highly desirable for numerous reasons, and especially for the following reasons, to wit: that there are no forwardly located rake-supporting or attaching connections to interfere with the free gathering action of the rakes and the accumulation of hay, alfalfa or other material gathered thereby; the rake truck wheels being located as stated, cause the rakes to partake of the same vertical movements of the tractor frame that will be imparted thereto by irregularities in the ground traveled; the rake truck wheels will best adapt themselves to the turning movements of the tractor and under such turning movements, will be given a minimum of sidewise skidding action; and moreover, by the arrangement described, the rake trucks are best adapted for high-speed travel of the tractor.

An embodiment of the invention is illustrated in the accompanying drawings, wherein like characters indicate like parts throughout the several views.

Referring to the drawings:

Fig. 1 is a plan view showing a tractor which happens to be a tractor, having the rakes attached thereto as above indicated and in accordance with my invention;

Fig. 2 is a left side elevation of the tractor and rakes shown in Fig. 1;

Fig. 3 is a fragmentary view partly in elevation and partly in vertical section approximately on the line 3—3 of Fig. 1;

Fig. 4 is a vertical section taken on the line 4—4 of Fig. 1, the tractor not being shown;

Fig. 5 is a transverse vertical section taken on the line 5—5 of Fig. 4; and

Fig. 6 is a perspective showing one of the rakes with one of the wheels removed.

The tractor illustrated is of the high-speed type and of the parts thereof, it is desirable particularly to note the truck frame 7, rear axle 8, rear traction wheels 9, front steering wheels 10, engine asssembly 11, transmission casing 12, driver's seat 13 and steering wheel 14. For the application of the rakes in accordance with my invention to a tractor such as that illustrated, the tractor frame is provided with a rigid rear extension. This rear extension preferably and as shown is in the form of a triangular truss 15, the legs of which at their front ends are rigidly secured to the rear portion of the tractor frame by suitable means such as nut-equipped bolts 16, which make the said truss or frame extension readily detachable.

The rake structures shown and preferably used each comprise a trussed rake back 17 and forwardly projecting tines 18. A long transverse trunnion-forming shaft or axle 19 is extended through the back frame 17 and secured thereto in bearings 20. On the projecting trunnions or ends of this axle 19, rake truck wheels 21 are journaled. These rakes, as stated, are supported one on each side of the tractor with the axles 19 in substantially the vertical plane that includes the axis of the rear or traction wheels of the tractor. As the truck wheels 21 are of less diameter than the traction wheels, their axes will be slightly below the axis of the latter, but the said traction wheels and rake wheels will be so relatively located that the rakes, when properly connected to the tractor, will partake of the vertical movements imparted to the tractor by varying elevations or irregularities in the ground traveled by the tractor.

A very feasible and desirable connection between the rakes and the tractor, whereby the former will be held in their said relation to the rear traction wheels, and will be forced forward entirely by pushing or thrusting action from connections located at the rear of the traction wheels, as illustrated in the drawings, and as shown, is as follows: For each rake there are two oblique compression or thrust-acting push bars 22 and 23 which, at their rear ends, are connected respectively at 22a and 23a by bolts or rivets, which preferably form somewhat loose connections so that the said bars are capable of slight vertical movements. At their front ends, the bars 22 and 23 are widely spaced and are pivotally connected to the respective rake being, as shown, directly mounted on the rear axle 19 thereof.

Under forward movements of the tractor, there will be a tendency for the back pressure due to the rake, to move the oblique thrust bars 22 and 23 laterally outward; and to prevent this, the said bars are tied together and to the rigid frame extension 15, this as shown being accomplished by tension bars or connections 24 and 25, see particularly Fig. 1. The connections between these links or connections 24, said bars and the frame extension 15 can be made by bolts or rivets loosely set so that the said links are capable of slight vertical movements, to adapt themselves to the slight vertical movements of the bars 22 and 23 produced by irregularities in the ground traveled.

By the connections described, it is evident that the rakes are capable of vertical tilting adjustments to raise and lower the points of the rake teeth by movements on the respective axle 19 or the equivalent pivotal connection between the rakes and their wheels. Suitable means should be provided for raising and lowering the rake teeth according to whether or not the rakes are in action or out of action; and for this purpose I have shown cables 26 attached at their outer ends to the tops of the respective rake backs 17, as best shown at 27 in Figs. 2 and 4. These cables at their inner ends are shown as attached to segments or arms 28, which latter are rigidly secured to levers 29 shown as mounted on a shaft 30 secured in lugs of a bar 31, which latter is rigidly secured to the extension frame 15. The said levers 29 are shown as provided with latch dogs 32 which co-operate with a common wide-faced ratchet segment 33 shown as rigidly secured to the frame bar 31.

The intermediate portions of the cables 26 are passed over or against guide sheaves or wheels 34 and 35. The sheaves 34 are shown as journaled in brackets 36 secured to the thrust bars 22 while the sheaves 35 are journaled to brackets 37 secured to the frame extension 15.

The manner in which the rakes can be raised and lowered to throw the same into and out of operation has already been stated, and the means therefor, as illustrated, includes manually-operated levers, but it is, of course, obvious that power mechanism may be employed if desired. When the two rakes are in operation, the lateral thrust on the machine produced by one will substantially neutralize the other, but nevertheless the rigid frame extension will resist any such lateral strains when one only of the rakes is in operation.

This rake attachment is a self-contained structure that may, as an entirety, be readily attached to or detached from the tractor frame. In the arrangement illustrated, this may be accomplished simply by removal or application of nut-equipped bolts 16 which connect the forward ends of the legs of the frame extension 15 to a sort of platform portion of the main frame 7, see particularly Fig. 3. When the frame extension 15 is thus detached, all of the elements of the rake attachment are disconnected from the tractor, but held in their assembled relation the one in respect to the other, so that the attachment may be again quickly connected to the tractor when desired.

From the foregoing, it is evident that the device described is capable of various modifications and arrangement of parts within the scope of the invention as herein disclosed and claimed.

What I claim is:

1. The combination with a tractor having rear traction wheels, of a rear frame extension connected to the frame of said tractor, a wheel-equipped rake located at a side of said tractor with the axes of its supporting wheels substantially in a vertical plane that includes the axis of said rear traction wheels, and oblique thrust-acting connections between said rake and rear frame extension.

2. The structure defined in claim 1 in which said rear frame extension is detachably secured to the tractor frame and the said rake and its connections to said detachable frame are removable with the latter.

3. The combination with a tractor having rear wheels, of a rear frame extension connected to the frame of said tractor, wheel-equipped rakes located one on each side of said tractor with their wheels laterally adjacent to said rear traction wheels, and inner and outer oblique thrust bars connected to said rear frame extension and to the respective rakes, said oblique bars being laterally tied to said frame extension to prevent laterally outward movements of said oblique thrust bars.

4. The structure defined in claim 3 in which said rakes are mounted for tilting movements on the axis of their supporting wheels, and in further combination with tilt-controlling connections applied to said rakes, thrust bars and frame extension.

5. The structure defined in claim 3 in which said rakes are mounted for tilting movements on the axis of their supporting wheels, and in further combination with tilt-controlling connections applied to said rakes, thrust bars and frame extension, said frame extension being detachably connected to the tractor frame, and said rakes, thrust bars and operating connections being removable from the tractor with said detachable extension frame.

6. The structure defined in claim 3 in which said rakes are mounted for tilting movements on the axis of their supporting wheels, and in further combination with tilt-controlling connections applied to said rakes, thrust bars and frame extension, said frame extension being detachably connected to the tractor frame, and said rakes, thrust bars and operating connections being removable from the tractor with said detachable extension frame, said tilt controlling connections including independently operative levers mounted on said frame extension.

7. The combination with a tractor having front and rear wheels, of a rear frame extension rigidly connected to the frame of said tractor and entirely supported thereby as a cantilever extension thereof, a wheel-equipped rake located entirely at one side of said tractor and rearward of the front wheels thereof, and oblique thrust-acting connections extended obliquely forward from the rear portion of said frame extension, and connected to said rake and impelling the same forward with a pushing action.

8. The structure defined in claim 7 in which said rake is mounted for vertical oscillatory adjustments on its wheels, and connections between the rake frame and rear frame extension whereby the said rake may be given oscillatory vertical adjustments.

9. The structure defined in claim 7 in which there is a rake and an oblique thrust-acting connection such as defined in said claim 7 located one on each side of said tractor, the thrust-acting connections of both being connected to said frame extension.

JOSEPH E. MURPHY.